United States Patent [19]

Häner et al.

[11] Patent Number: 4,969,421

[45] Date of Patent: Nov. 13, 1990

[54] COOLING DEVICE FOR AN INTERNAL COMBUSTION ENGINE

[75] Inventors: Bernhard Häner, Russelsheim; Siegfried Sieben, Nauheim, both of Fed. Rep. of Germany

[73] Assignee: General Motors Corporation, Detroit, Mich.

[21] Appl. No.: 428,399

[22] Filed: Oct. 30, 1989

[30] Foreign Application Priority Data

Nov. 18, 1988 [DE] Fed. Rep. of Germany ....... 3839009

[51] Int. Cl.$^5$ ................................................ F01P 7/10
[52] U.S. Cl. .............................. 123/41.49; 415/208.1
[58] Field of Search ................ 123/41.48, 41.49, 41.7; 416/169 A; 415/208.1, 211.1, 211.2, 223, 182.1

[56] References Cited

U.S. PATENT DOCUMENTS

| | | | |
|---|---|---|---|
| 1,243,549 | 10/1917 | Peterson | 123/41.49 |
| 1,397,047 | 11/1921 | Harris | 123/41.48 |
| 1,933,949 | 11/1933 | Weber | 123/41.49 |
| 4,396,351 | 8/1983 | Hayashi et al. | 123/41.49 |
| 4,476,820 | 10/1984 | Nixon | 123/41.05 |

FOREIGN PATENT DOCUMENTS

| | | |
|---|---|---|
| 1804607 | 5/1970 | Fed. Rep. of Germany . |
| 2540040 | 3/1977 | Fed. Rep. of Germany . |
| 59-103822 | 7/1984 | Japan . |

*Primary Examiner*—Noah P. Kamen
*Attorney, Agent, or Firm*—A. Michael Tucker

[57] ABSTRACT

The present invention comprises a cooling device for an internal combustion engine disposed in an engine compartment of a motor vehicle. A radiator is positioned in front of the internal combustion engine. An axial-radial blower serving to feed cooling air through the radiator into the engine compartment is mounted between the radiator and the internal combustion engine. An air collection housing with an air outlet directed into the upper area of the engine compartment is connected to the axial-radial blower. The air collection housing and outlet collect and direct the cooling air fed by the axial-radial blower for the purpose of cooling the engine block, especially parts of the internal combustion engine that are thermally intensely stressed.

4 Claims, 3 Drawing Sheets

COOLING DEVICE FOR AN INTERNAL COMBUSTION ENGINE

BACKGROUND OF THE INVENTION

1. Field of the Invention.

The present invention pertains to a cooling device for an internal combustion engine disposed in an engine compartment of a motor vehicle, with a radiator positioned in front of the internal combustion engine and an axial-radial blower serving to feed cooling air through the radiator into the engine compartment.

2. Statement of the Related Art.

In a motor vehicle powered by an internal combustion engine with general state-of-the-art water cooling, a blower, which as a rule is formed as an axial blower, is mounted in front of or behind the cooling water radiator to support the engine cooling. The blower is actuated by an electric motor (e.g., in the case of a diagonally built-in internal combustion engine), but can also be actuated directly by the internal combustion engine (e.g., with flush fitting of same). Usually, a thermoswitch with a temperature detection device in the radiator serves to trigger the blower. The blower can also be triggered by a viscous fluid coupling reacting to the air temperature behind the radiator. However, based on the factors prevailing in the area of the engine compartment (mounted in the front) or the engine block of a motor vehicle, the air streamed through the radiator can no longer be additionally used to cool the engine compartment or the structure. The air fed by the axial blower only touches the engine block. In the case of an adequate driving speed of the motor vehicle and the flow ratios caused thereby (relative wind), a vacuum is formed under the engine, which leads to a brisk downwards flowing away of the air fed through the blower. These pressure ratios on the engine block which are detrimental to the engine cooling are further increased by the front spoiler in common use today. Thus, in practice, the cooling air fed by the axial blower barely comes into contact with the engine block, by means of which the desired secondary cooling effect is substantially lost.

A cooling device of the type mentioned above is known from DE-AS No. 25 40 040. In this case, an axial-radial blower, in which the direction of the cooling stream is in front of a cooling water radiator designed as an annular radiator, is used to aerate and to cool the engine compartment. Thus, the annular radiator is on the pressure side of the blower, which intensely aggravates an air feed aimed to especially heated engine parts (such as the exhaust manifolds).

Furthermore, in the known cooling device, according to DE-AS No. 25 40 040, an engine compartment is provided that is completely closed up to an air input opening and an air output opening. In motor vehicles of conventional structure, particularly in cars, it is common to leave the engine compartment open toward the bottom or to compartmentalize it possibly partially by an engine compartment cover at a distance from the engine for reasons of noise. In such an engine compartment design, the cooling device according to DE-AS No. 25 40 040 would not be very effective, especially since the air exchange caused by the device with regard to the flow-through direction is more likely random and is only caused by the pressure differences between the air input opening and the output opening.

Additional disadvantages of the known cooling device according to DE-AS No. 25 40 040 are shown in that part of the outgoing air moves toward the outside and that the cooling only functions with a running fan.

The task of the present invention is to make possible a purposeful and effective cooling of the engine block, particularly the areas which are at a critical temperature and are highly heated, in which all the cooling air fed by the blower can be used and which also displays its full effect in the common engine compartments of today's front-wheel-drive motor vehicles which are characterized by restricted space proportions and are open at the bottom.

According to the invention, the task is solved by a cooling device of the type described above, in that the axial-radial blower in a known manner is mounted between the radiator and the internal combustion engine and that an air collection housing is connected to the axial-radial blower with air output directed into the upper area of the engine compartment.

It is known from DE-OS No. 18 04 607 that the radiator is mounted on the suction side of the blower, i.e., the blower is mounted between the radiator and the internal combustion engine. However, in this known, but non-generic cooling device, a partial amount of the outgoing air from the radiator is suctioned by the cooling blower through the engine compartment. Therefore, the cooling device according to DE-OS No. 18 04 607 cannot solve the task specifically set in the present application.

SUMMARY OF THE INVENTION

By means of the present invention, an overheating of temperature-sensitive parts, especially in the upper and rear engine compartment area, is effectively avoided, because not only the cooling air fed into the upper part of the blower, but also the cooling air fed into the lower half of same, is completely applied to the cooling of the engine block and the structure. A purposeful blowing against the heat-intensive engine parts is advantageously made possible by means of the air collection housing according to the present invention.

Also in this case, the use of an axial-radial blower (instead of the common axial blower) and the mounting of which between the radiator and the internal combustion engine (i.e., the mounting of the radiator on the suction side of the blower) are advantageously effective. An axial-radial blower, as compared to an axial blower, is also suitable for higher pressure differences, such that the restriction provided in axial blowers with regard to total air resistance of the front of the vehicle, of the core of the radiator and of the locking by means of the fully packed engine compartment is lost. By means of the cooling device according to the present invention, an effective, even though low, aeration and cooling of the engine block is also provided by means of the overflow air (i.e., by means of the relative wind in the case of a moving vehicle). If the cooling water temperature exceeds a given yet incidental value, i.e., if the driving speed alone is no longer adequate for an effective cooling and/or if maximum engine performance is required over a longer operating time, the blower is switched on and, in addition to an increased water cooling, provides for the forced cooling of the engine compartment and the structural parts at critical temperature.

In an advantageous improvement of the present invention, it is suggested that the air collection housing be connected to the lower half of the axial-radial blower, be a spiral-shaped segment and have a constantly expanding cross section in the direction of rotation of the axial-radial blower.

For the lowest possible construction expense, this embodiment takes into account the circumstance that the air fed into the upper area of the axial-radial blower also reaches the engine block surface, such that a special air feed is not implicitly required. In contrast, the outgoing air of the blower, which is fed into the lower half of the axial-radial blower, yet flows away toward the bottom without cooling effect, is completely picked up by the air collection housing according to the invention and aimed at the temperature-intensive engine block parts.

Since the exhaust manifolds represent an especially intensive heat source for the temperature load originating in the engine compartment, it is suggested in a further development of the invention that the air output of the air collection housing be directed at the exhaust manifold(s) of the internal combustion engine.

BRIEF DESCRIPTION OF THE DRAWINGS

An exemplary embodiment of the invention which is described below in detail is shown in the drawings.

DETAILED DESCRIPTION OF THE PREFERRED EMBODIMENT

Figure 1:
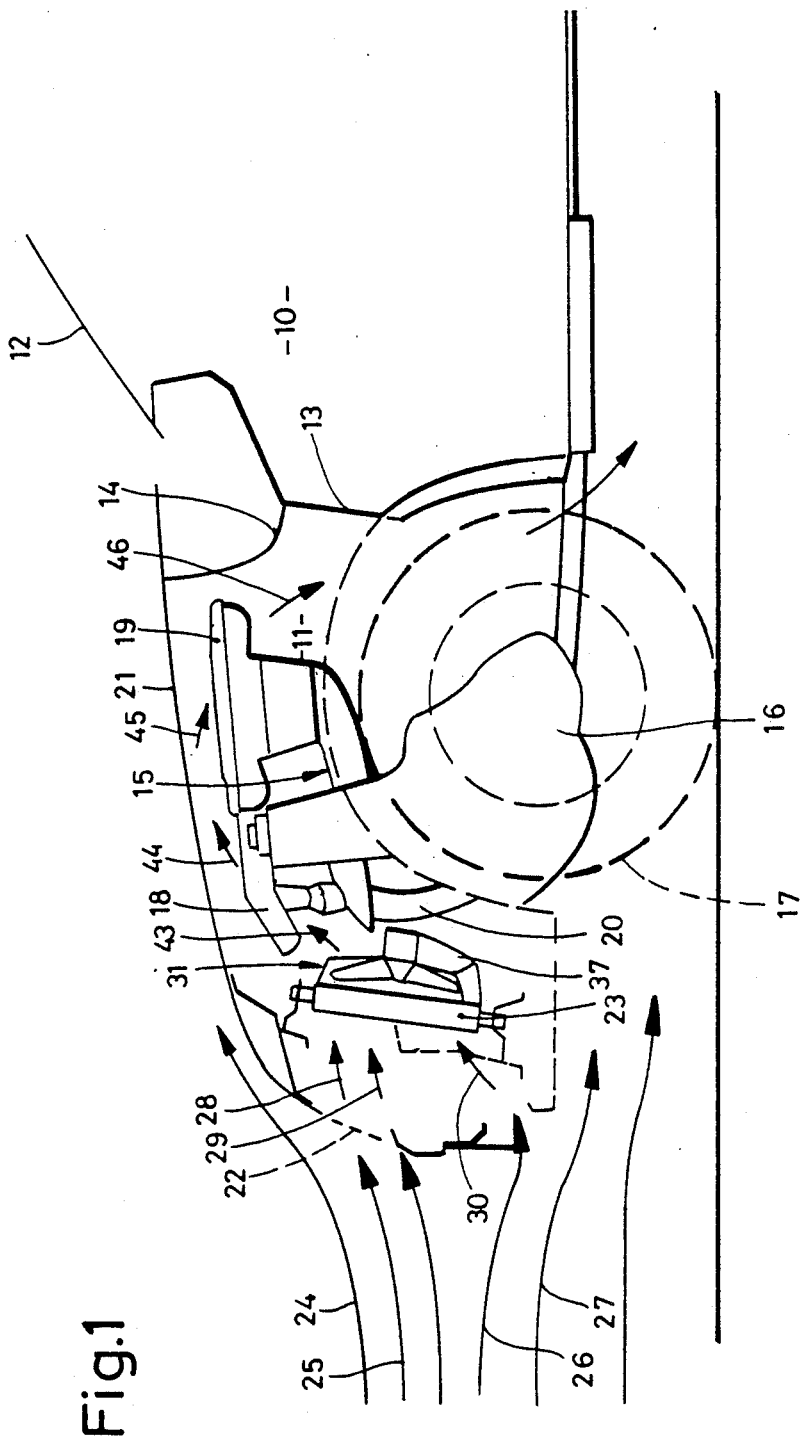
FIG. 1 schematically shows a vertical, longitudinal section through the front part of a car.

In FIG. 1, 10 is the interior, 11 is the engine compartment and 12 is the windshield of a car. The interior 10 and the engine compartment 11 are separated from one another three-dimensionally by a dashboard cowl 13, on the upper end of which is formed a so-called radiator tank 14. The motor vehicle is driven by an internal combustion engine 15, to which a combined transmission/differential 16 is flanged, mounted diagonally in the engine compartment 11. Thus, this car has front-wheel drive. One of the two driven front wheels is indicated in broken lines and referenced with 17. An air suction tube 18 with an air filter 19 connected to it can be seen above the internal combustion engine 15. An exhaust manifold is indicated at 20.

The engine compartment 11 is covered by a hood 21. A radiator grill 22, behind which is mounted a cooling-water flow-through radiator 23, forms the front end of the engine compartment 11. When the vehicle is operated, relative wind flows against this grill as indicated by arrows 24–27. A part of the air striking the front of the vehicle flows through the radiator grill 22, as clearly shown by arrows 28, 29 and 30, and thus reaches the cooling blades of the cooling water radiator 23, thereby cooling the cooling fluid heated by the engine.

Figure 2:
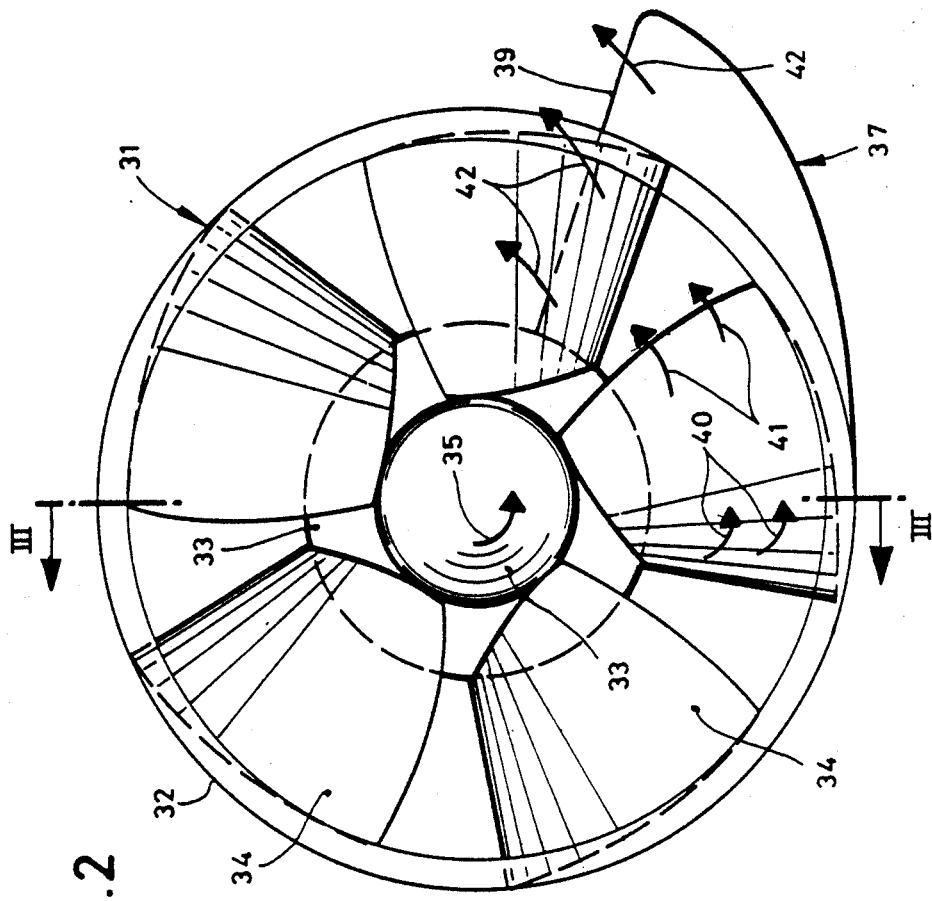
FIG. 2 shows a blower for cooling and aerating the engine, in front view (arrow direction A in FIG. 3).
Figure 3:
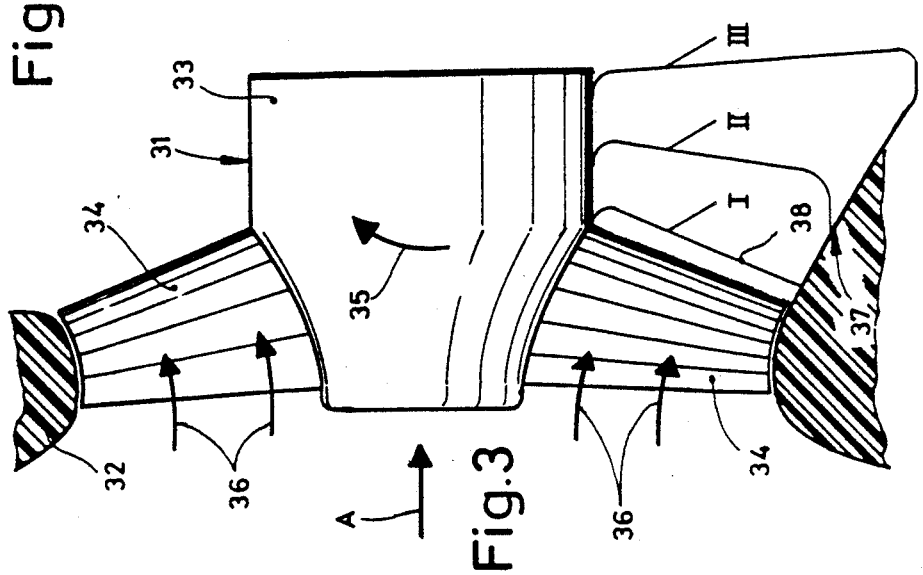
FIG. 3 shows a partial section along line III—III of FIG. 2.
Figure 4:
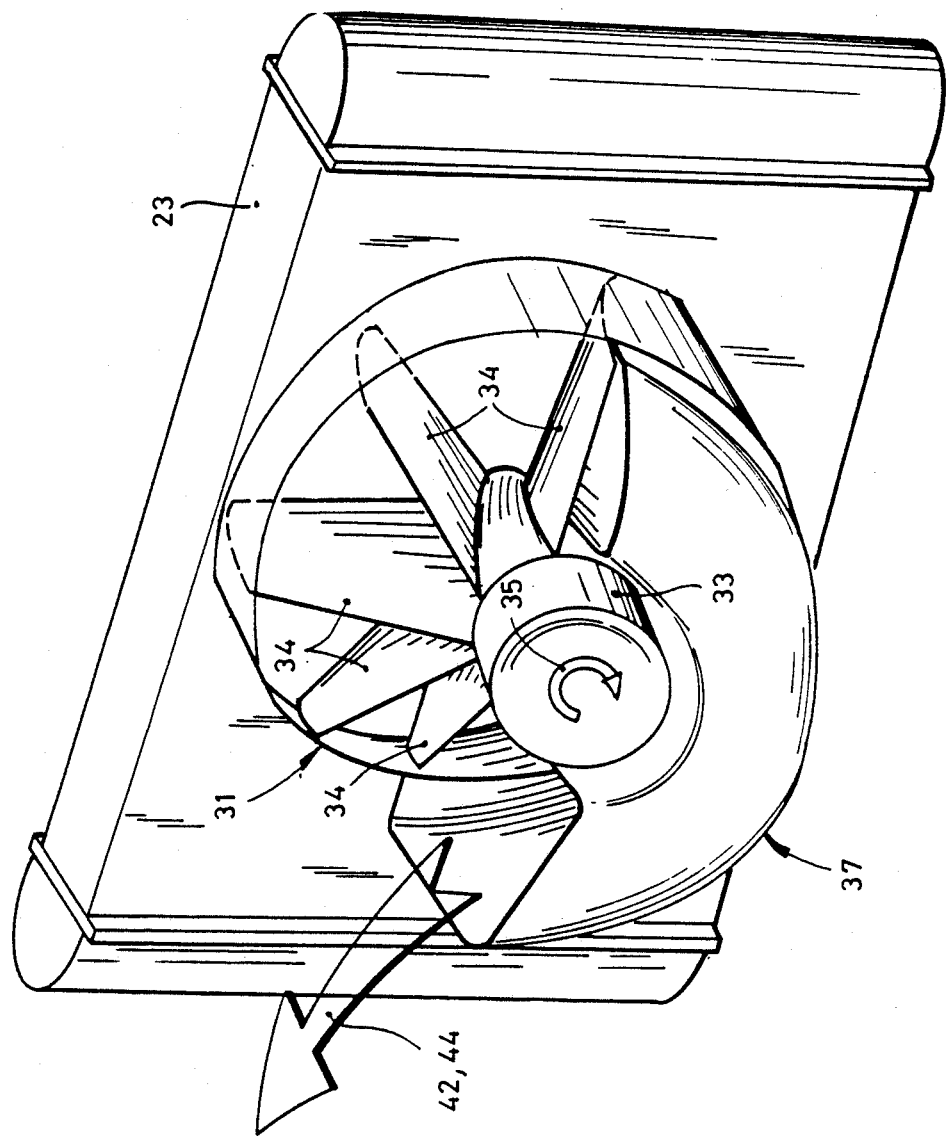
FIG. 4 shows the radiator and blower according to FIG. 1 to 3, in perspective representation, viewed diagonally from the inside of the engine compartment looking out.

An axial-radial blower indicated as a whole with 31, which is shown in detail in FIGS. 2 and 3 (in enlarged view compared to FIG. 1), is mounted between the radiator 23 and the internal combustion engine 15. The axial-radial blower 31 generally has the task of providing for an intensification of the air stream 28–30 and thus the cooling performance of the radiator 23, and particularly at high outside temperatures and/or if the vehicle is only moving forward at a low speed or is stationary. Furthermore, the axial-radial blower 31 serves the objective of using the air employed for recooling the cooling water after flowing through the radiator blades once more for cooling purposes, as well as for cooling the engine block of the internal combustion engine 15, and/or for cooling areas or structural parts thermally especially intensely stressed, such as, for example, the exhaust manifold 20.

The design and mode of function of the axial-radial blower 31 are evident in detail, especially from FIG. 2. Thus, the axial-radial blower 31 has a housing 32, within which an impeller 33 is mounted rotationally with essentially radially arranged blades 34. The direction of rotation is marked by an arrow 35 respectively. The air (coming from the radiator 23) is suctioned or fed in the arrow direction 36 (FIG. 3) by the rotating axial-radial blower 31. As is a further evident from FIGS. 2 and 3, an air collection housing 37, which is spiral-shaped segment and has constantly increasing cross sections in the direction of rotation 35 (cf. FIG. 2), is connected to the axial-radial blower 31 in the lower area of the pressure side of same. In FIGS. 2 and 3, three cross sections lying at about the same distance from one another are selected as examples and are numbered I, II and III. Cross section I characterizes the minimum cross section at the entrance of the air collection housing 37, while II characterizes the maximum cross section at the exit 39 of the air collection housing 37. The feed direction of the air within the air collection housing 37 is illustrated by arrows 40–42.

No air collection housing is needed on the pressure side in the upper area of the axial-radial blower 31. The air fed in also reaches into the upper area of the engine compartment 11 (cf. arrow 43 in FIG. 1). However, by means of the arrangement and formation of the air collection housing 37 described above, the air fed into the lower half of the axial-radial blower 31 also reaches into the upper area of the engine compartment 11, approximately in the manner as is marked in FIG. 1 by arrows 43–46.

Thus, it is possible to harness substantially all the air fed by the axial-radial blower 31 for the purpose of cooling the engine block of the internal combustion engine 15 or parts of the same that are thermally especially stressed. Thus, for example, it is easily possible to direct the air output 39 of the air collection housing 37 aimed at the exhaust manifold representing a primary heat source within the engine compartment 11.

The temperature and flow ratios in the area of the engine compartment 11 should become clear by means of the numerical example below:

Air input temperature in front of the radiator 23: about 30° C.

Air output temperature behind the radiator about 70° C.

Air volume flow through the radiator 23: about 20 m$^3$/minute.

Critical temperature of structural parts in the engine compartment 11: about 130° C.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A cooling device for an internal combustion engine disposed in an engine compartment of a motor vehicle, wherein a radiator is positioned in front of an internal combustion engine and an axial-radial blower serving to feed cooling air through the radiator into the engine compartment is mounted between the radiator and the internal combustion engine, the cooling device connected to and adapted for use with the axial-radial blower and comprising;

an air collection housing formed as a spiral-shaped segment having a constantly expanding cross section in the direction of rotation of the axial-radial blower and an air outlet directed into the upper area of the engine compartment.

2. The cooling device as specified in claim 1 wherein the air collection housing is connected to the lower half of the axial-radial blower.

3. The cooling device as specified in claim 1 wherein the air outlet of the air collection housing is directed toward the exhaust manifold of the internal combustion engine.

4. The cooling device as specified in claim 1 wherein the air outlet of the air collection housing is directed above and away from the internal combustion engine.

* * * * *